United States Patent
Ruan

(10) Patent No.: US 8,526,675 B2
(45) Date of Patent: Sep. 3, 2013

(54) GESTURE RECOGNITION APPARATUS, METHOD FOR CONTROLLING GESTURE RECOGNITION APPARATUS, AND CONTROL PROGRAM

(75) Inventor: Xiang Ruan, Kyoto (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 148 days.

(21) Appl. No.: 13/035,107

(22) Filed: Feb. 25, 2011

(65) Prior Publication Data

US 2011/0222726 A1    Sep. 15, 2011

(30) Foreign Application Priority Data

Mar. 15, 2010   (JP) ................................ 2010-058543

(51) Int. Cl.
*G06K 9/00* (2006.01)
*H04N 5/225* (2006.01)

(52) U.S. Cl.
USPC ......................................... 382/103; 348/169

(58) Field of Classification Search
USPC ................. 382/103, 107, 236; 348/169–172, 348/352; 715/863
See application file for complete search history.

(56) References Cited

U.S. PATENT DOCUMENTS

| | | | |
|---|---|---|---|
| 7,551,980 B2 * | 6/2009 | Sakagami et al. | 700/258 |
| 2010/0046796 A1 * | 2/2010 | Pietquin | 382/103 |

FOREIGN PATENT DOCUMENTS

| | | |
|---|---|---|
| JP | 9-311759 | 12/1997 |
| JP | 2007-87089 | 4/2007 |
| JP | 2007-272839 | 10/2007 |

OTHER PUBLICATIONS

Patent Abstracts of Japan for Japanese Publication No. 2007-087089, Publication date Apr. 5, 2007 (1 page).
Patent Abstracts of Japan for Japanese Publication No. 09-311759, Publication date Dec. 2, 1997 (1 page).
Patent Abstracts of Japan for Japanese Publication No. 2007-272839, Publication date Oct. 18, 2007 (1 page).
Bretzner, et al., "Hand Gesture Recognition using Multi-Scale Colour Features, Hierarchical Models and Particle Filtering", Proceedings of the Fifth IEEE International Conference on Automatic Face and Gesture Recognition, May 2002, pp. 1-6 (6 pages).
J. Davis, et al., "Visual gesture recognition", IEE Proc.-Vis. Image Signal Process., vol. 141, No. 2, Apr. 1994, pp. 101-106 (6 Pages).
M.K. Bhuyan, et al., "Feature Extraction from 2D Gesture Trajectory in Dynamic Hand Gesture Recognition", IEE Jun. 2006 (6 Pages).

(Continued)

*Primary Examiner* — Abolfazl Tabatabai
(74) *Attorney, Agent, or Firm* — Osha Liang LLP

(57) ABSTRACT

A gesture recognition apparatus is caused to correctly recognize start and end of a gesture without use of special unit by a natural manipulation of a user and low-load processing for the gesture recognition apparatus. The gesture recognition apparatus that recognizes the gesture from action of a recognition object taken in a moving image includes: a gravity center tracking unit that detects a specific subject having a specific feature from the moving image; a moving speed determining unit that computes a moving speed per unit time of the specific subject; a moving pattern extracting unit that extracts a moving pattern of the specific subject; and a start/end judgment unit that discriminates movement of the specific subject as an instruction (such as an instruction to start or end gesture recognition processing) input to the gesture recognition apparatus when the moving speed and the moving pattern satisfy predetermined conditions.

19 Claims, 7 Drawing Sheets

(56) References Cited

OTHER PUBLICATIONS

Ho-Sub Yoon et al., "Hand gesture recognition using combined features of location, angle and velocity", Pattern Recognition Society, 2001 (11 Pages).

Pengyu Hong et al., "Construction Finite State Machines for Fast Gesture Recognition", IEE 2000 (4 Pages).

Alexandra Stefan et al., "Translation and Scale-Invariant Gesture Recognition in Complex Scenes", PETRA 2008, Athens, Greece (8 Pages).

Francisco Florez et al., "Hand gesture recognition following the dynamics of a topology-preserving network", Proceedings of the Figth IEEE International Conference on Automatic Face and Gesture Recognition (FGR'02) (6 Pages).

* cited by examiner

GESTURE RECOGNITION APPARATUS, METHOD FOR CONTROLLING GESTURE RECOGNITION APPARATUS, AND CONTROL PROGRAM

1. TECHNICAL FIELD

The present invention relates to a gesture recognition apparatus that recognizes a gesture from action of a recognition object, a method for the gesture recognition apparatus, and a control program.

2. BACKGROUND

Recently a gesture recognition technology is applied to and developed in various fields such as an intelligent robot, a game, a simulation, and a production technology as communication means between a human and a computer. Specifically, the gesture recognition apparatus performs image processing to a moving image obtained by imaging a hand or fingers of the human with a video camera and recognizes a series of specific movements (hereinafter referred to as gesture) of a specific portion. The computer can perform various pieces of processing according to the gesture recognized by the gesture recognition apparatus.

In the gesture recognition technology (for example, a technology in which a finger posture (gesture) of a user is recognized instead of a remote controller of a television set to remotely control an operation of the television set) applied to a user interface, it is necessary for the gesture recognition apparatus to correctly judge that a range of the movement of the user correspond to the gesture to be recognized. That is, it is necessary that the gesture recognition apparatus correctly judge start and end points of the recognition processing in the moving image in order to realize the correct gesture recognition in which the false recognition is hardly generated.

For example, in gesture recognition method and apparatus disclosed in Japanese Unexamined Patent Publication No. 09-311759, the user possesses a penlight that emits a light having a predetermined color and the apparatus recognizes the start and end of the gesture by turning on and off the penlight.

On the other hand, there is a technique of correctly recognizing the gesture by special unit without issuing the instruction to start and end the recognition processing.

For example, Japanese Unexamined Patent Publication No. 2007-087089 discloses a gesture recognition apparatus, in which a moving direction of the human's hand is grasped as an observation signal, a set of the predetermined number of observation signals is compared to a previously-prepared HMM (Hidden Markov Model) corresponding to a kind of the gesture, thereby recognizing the gesture.

In a gesture recognition apparatus disclosed in Japanese Unexamined Patent Publication No. 2007-272839, an action direction of a moving object is obtained and accumulated as a vector from continuously-input frame images to produce a vector feature quantity expressing the gesture, a state of the vector feature quantity is compared the before-and-after states to determine a state transition (progression, stagnation, and recession of the state), thereby determining whether the vector feature quantity holds as the gesture.

However, in the gesture recognition method and apparatus disclosed in Japanese Unexamined Patent Publication No. 09-311759, unfortunately it is necessary for the user who performs the gesture to possess the special light-emitting unit such as the penlight in order to use the gesture recognition apparatus.

In the pieces of gesture recognition apparatus disclosed in Japanese Unexamined Patent Publication Nos. 2007-087089 and 2007-272839, although the gesture recognition apparatus is independent of the special unit, unfortunately it is necessary to perform high-load image recognition processing equal to the original gesture recognition to all the frame images. Particularly, in order to recognize a fine gesture such as a specific finger posture, it is necessary to provide a complicated gesture recognition algorithm, which results in a problem in that the load on the apparatus is further increased. When the judgment of the start and end points of the gesture is mistakenly made, unfortunately there is a high possibility that the gesture is mistakenly recognized.

SUMMARY

One or more embodiments of the invention provides a gesture recognition apparatus that correctly recognizes an instruction relating to gesture recognition processing by the natural manipulation of the user and low-load processing for the apparatus, a method for controlling the gesture recognition apparatus, and a control program.

In accordance with one or more embodiments of the invention, a gesture recognition apparatus that performs gesture recognition processing of recognizing a gesture from action of a recognition object taken in a moving image, the gesture recognition apparatus includes: specific subject detecting unit for detecting a specific subject having a specific feature from the moving image; moving speed computing unit for computing a moving speed per unit time of the specific subject; moving pattern extracting unit for extracting a moving pattern of the specific subject; and input instruction discriminating unit for discriminating movement of the specific subject as an instruction input to the gesture recognition apparatus when the moving speed and the moving pattern satisfy predetermined conditions.

According one or more embodiments of the invention, the specific subject detecting unit detects the specific subject having the specific feature. The movement of the specific subject is analyzed from the moving image. That is, the moving speed computing unit computes the moving speed of the specific subject, and the moving pattern extracting unit extracts the moving pattern of the specific subject.

Finally, in one or more embodiments of the invention, the input instruction discriminating unit judges that the movement of the specific subject means the instruction (such as the instruction to start and end the gesture recognition) input to the gesture recognition apparatus, when the moving speed and the moving pattern of the specific subject satisfy the predetermined conditions.

In one or more embodiments of the invention, the specific subject has the visual feature taken in the moving image, and the specific subject detecting unit can detect the specific subject through the image processing. Any specific subject can be used as the user interface of the gesture recognition apparatus as long as the specific subject has the feature taken in the moving image, and it is not necessary to use the special unit as the specific subject.

In one or more embodiments of the invention, it is only necessary to analyze the moving speed and the moving pattern of the specific subject. Therefore, unlike the conventional gesture recognition processing, it is not necessary to finely analyze the color or shape, so that the movement of the specific subject can be monitored without performing the high-load image processing. On the other hand, the user can transmit the instruction to the gesture recognition apparatus by the natural manipulation in which the user moves the specific subject.

As a result, advantageously the gesture recognition apparatus can be caused to correctly recognize the instruction relating to the gesture recognition processing independently of the special unit by the simple manipulation of the user and the low-load processing for the apparatus.

In accordance with one or more embodiments of the present invention, a gesture recognition apparatus that performs gesture recognition processing of recognizing a gesture from action of a recognition object taken in a moving image, the gesture recognition apparatus includes: specific subject detecting unit for detecting a specific subject having a specific feature from the moving image; moving speed computing unit for computing a moving speed per unit time of the specific subject; moving pattern extracting unit for extracting a moving pattern of the specific subject; and start/end judgment unit for judging that movement of the specific subject is an instruction of start or end of the gesture recognition processing when the moving speed and the moving pattern satisfy predetermined conditions.

According to one or more embodiments of the invention, the specific subject detecting unit detects the specific subject having the specific feature. The movement of the specific subject is analyzed from the moving image. That is, the moving speed computing unit computes the moving speed of the specific subject, and the moving pattern extracting unit extracts the moving pattern of the specific subject.

Finally, in one or more embodiments of the invention, the start/end judgment unit judges that the movement of the specific subject means the instruction (such as the instruction to start and end the gesture recognition) input to the gesture recognition apparatus, when the moving speed and the moving pattern of the specific subject satisfy the predetermined conditions.

In one or more embodiments of the invention, the specific subject has the visual feature taken in the moving image, and the specific subject detecting unit can detect the specific subject through the image processing. Any specific subject can be used in the instruction of the start and end of the gesture recognition processing as long as the specific subject has the feature taken in the moving image, and it is not necessary to use the special unit as the specific subject.

In one or more embodiments of the invention, it is only necessary to analyze the moving speed and the moving pattern of the specific subject. Therefore, even if the live gesture recognition processing is the high-load image processing in which the fine analysis is required with respect to the color and the shape, the movement of the specific subject can be monitored through the low-load processing in other time zones. The pattern (condition) that does not overlap the gesture used in the live gesture recognition processing can previously be fixed as the movement of the specific subject (moving speed and moving pattern) that means the start and end of the gesture recognition processing. Because the movement of the specific subject satisfying the condition different from the gesture is recognized as a signal of the start and end of the gesture recognition processing, the signal of the start and end can correctly be recognized while the movement of the specific subject is not confused with the gesture recognized through the gesture recognition processing. On the other hand, the user can transmit the signal of the start and end to the gesture recognition apparatus by the natural manipulation in which the user moves the specific subject.

As a result, advantageously the gesture recognition apparatus can be caused to correctly recognize the start and end of the gesture independently of the special unit by the simple manipulation of the user and the low-load processing for the apparatus.

In one or more embodiments of the invention, the specific subject detecting unit detects an organ of the user or part of the organ as the specific subject.

According to one or more embodiments of the invention, even if the user does not possess an additional article, the user can correctly and simply issue the instruction to start and end the gesture recognition processing to the gesture recognition apparatus by moving part of the user's body.

The specific subject detecting unit may detect the user's palm as the specific subject. Therefore, the user can correctly and simply issue the instruction to start and end the gesture recognition processing to the gesture recognition apparatus by the simple, natural action such as moving the hand.

In one or more embodiments of the invention, the gesture recognition apparatus further includes gesture recognition unit for performing the gesture recognition processing by discriminating a finger posture of the user as the recognition object taken in a moving image, wherein the gesture recognition unit may discriminate the finger posture from a frame of the moving image from a start point to an end point, the start point and the end point being judged by the start/end judgment unit.

In one or more embodiments of the invention, it is only necessary for the gesture recognition unit to perform the gesture recognition processing from the start to the end by the signal of the specific subject. When the live gesture recognition processing is the high-load processing such as the recognition of the finger posture, the configuration has the particularly large effect because the load can largely be reduced.

Because the signal of the start and end is performed by analyzing the movement of the specific subject, in accordance with one or more embodiments of the invention, the signal of the start and end differs largely from the finger posture that is discriminated as the gesture in the analysis target. Accordingly, even if the monitoring regions are similar to each other such that the specific subject is the palm while the gesture recognition object is the finger, the gesture recognition apparatus can avoid the false recognition to correctly judge the start and end of the gesture recognition processing.

In one or more embodiments of the invention, the specific subject detecting unit may specify a specific subject region including at least part of the specific subject on the frame of the moving image and specify a gravity center position coordinate in the specific subject region.

Therefore, the moving speed and the moving pattern of the specific subject can be analyzed through the low-load processing.

In one or more embodiments of the invention, the moving speed computing unit normalizes a moving distance per unit time of the gravity center in the specific subject region by a size of the specific subject region and computes the moving speed based on a gravity center moving amount obtained by the normalization.

Therefore, in accordance with one or more embodiments of the invention, the difference of the way the specific subject is imaged, caused by the difference of the distance between the imaging unit that images the action and the user, can be absorbed to judge the start and end of the gesture recognition processing with higher accuracy.

In one or more embodiments of the invention, the moving pattern extracting unit may extract a variance of the gravity center position coordinates with respect to the gravity centers of the specific subject regions, the gravity centers of the specific subject regions being specified with respect to the plurality of frames in the moving image.

Therefore, in accordance with one or more embodiments of the invention, by adjusting the moving region of the specific subject, the user can discriminate between the signal of the start and end and the gesture to correctly transmit the instruction to the gesture recognition apparatus.

In one or more embodiments of the invention, the input instruction discriminating unit may discriminate the movement of the specific subject as the instruction of the start or end of the gesture recognition processing, when the moving speed computed by the moving speed computing unit is more than a predetermined threshold, and when the variance of the gravity center position coordinate extracted by the moving pattern extracting unit falls within a range from a predetermined lower threshold to a predetermined upper threshold.

Therefore, in accordance with one or more embodiments of the invention, the gesture recognition apparatus can correctly judge the signal of the start and end by the pattern in which the specific subject "wiggles with an intention". Usually the pattern is not used as the pattern of the gesture in the gesture recognition processing. The user can move the specific subject with the pattern by the natural manipulation.

As a result, advantageously the gesture recognition apparatus that is caused to correctly recognize the start and end of the gesture independently of the special unit by the simple manipulation of the user and the low-load processing for the apparatus can be implemented.

In one or more embodiments of the invention, the specific subject detecting unit may detect a user's possession having a specific feature in color or shape as the specific subject.

In one or more embodiments of the invention, the input instruction discriminating unit may be gesture recognition unit for recognizing the movement of the specific subject as the gesture based on the moving speed and the moving pattern of the specific subject.

Therefore, in accordance with one or more embodiments of the invention, the live gesture recognition processing can be performed without performing the high-load image processing in which the fine analysis is required for the color and shape. Accordingly, the processing load can largely reduced in the gesture recognition apparatus. The false recognition can be prevented between the gesture used in the live gesture recognition processing and the signal of the start and end when the moving speed or moving pattern conditions that are not similar to each other are previously allocated to the gesture used in the live gesture recognition processing and the signal of the start and end.

In accordance with one or more embodiments of the invention, a method for controlling a gesture recognition apparatus that performs gesture recognition processing of recognizing a gesture from action of a recognition object taken in a moving image, the gesture recognition apparatus controlling method includes the steps of: detecting a specific subject having a specific feature from the moving image; computing a moving speed per unit time of the specific subject; extracting a moving pattern of the specific subject; and discriminating movement of the specific subject as an instruction input to the gesture recognition apparatus when the moving speed and the moving pattern satisfy predetermined conditions.

In one or more embodiments of the invention, the gesture recognition apparatus may be implemented by a computer. In such cases, a control program for gesture recognition apparatus, which implement the gesture recognition apparatus with the computer by operating the computer as each of the unit, and a computer-readable recording medium in which the control program for gesture recognition apparatus is recorded are also included in the invention.

As described above, the gesture recognition apparatus according to one or more embodiments of the invention includes: the specific subject detecting unit for detecting a specific subject having a specific feature from the moving image; the moving speed computing unit for computing a moving speed per unit time of the specific subject; the moving pattern extracting unit for extracting a moving pattern of the specific subject; and the input instruction discriminating unit for discriminating movement of the specific subject as an instruction input to the gesture recognition apparatus when the moving speed and the moving pattern satisfy predetermined conditions.

As described above, the method for controlling a gesture recognition apparatus according to one or more embodiments of the invention includes the steps of: detecting a specific subject having a specific feature from the moving image; computing a moving speed per unit time of the specific subject; extracting a moving pattern of the specific subject; and discriminating movement of the specific subject as an instruction input to the gesture recognition apparatus when the moving speed and the moving pattern satisfy predetermined conditions.

Accordingly, in one or more embodiments of the invention, the gesture recognition apparatus that correctly recognizes an instruction relating to gesture recognition processing independently of special unit and by the simple manipulation of the user and the low-load processing for the apparatus can advantageously be implemented.

DETAILED DESCRIPTION

Hereinafter, a one or more embodiments of the present invention will be described with reference to the drawings.

A gesture recognition apparatus according to one or more embodiments of the invention recognizes start and end of a gesture based on a moving speed and a moving pattern of a specific subject taken with an imaging unit. The specific subject means a physical object in which features such as colors and shapes are unified to some extent. Preferably the specific subject is not special unit, but part of a user's body or a personal item daily possessed by the user. The color and shape of a human hand is substantially unified. The hand is suitable to the specific subject because the hand is part of the user's body. In one embodiment, a gesture recognition apparatus that recognizes a palm of the user as the specific subject to judge the start and end of the gesture will be described by way of example. It is assumed that the gesture recognition apparatus of the embodiment recognizes postures of hands and fingers as a subject (recognition object) that becomes the gesture recognition target to discriminate the kinds of the gestures in original gesture recognition processing from the judged start to the judged end by way of example.

(Configuration of Gesture Recognition Apparatus)

Figure 1:
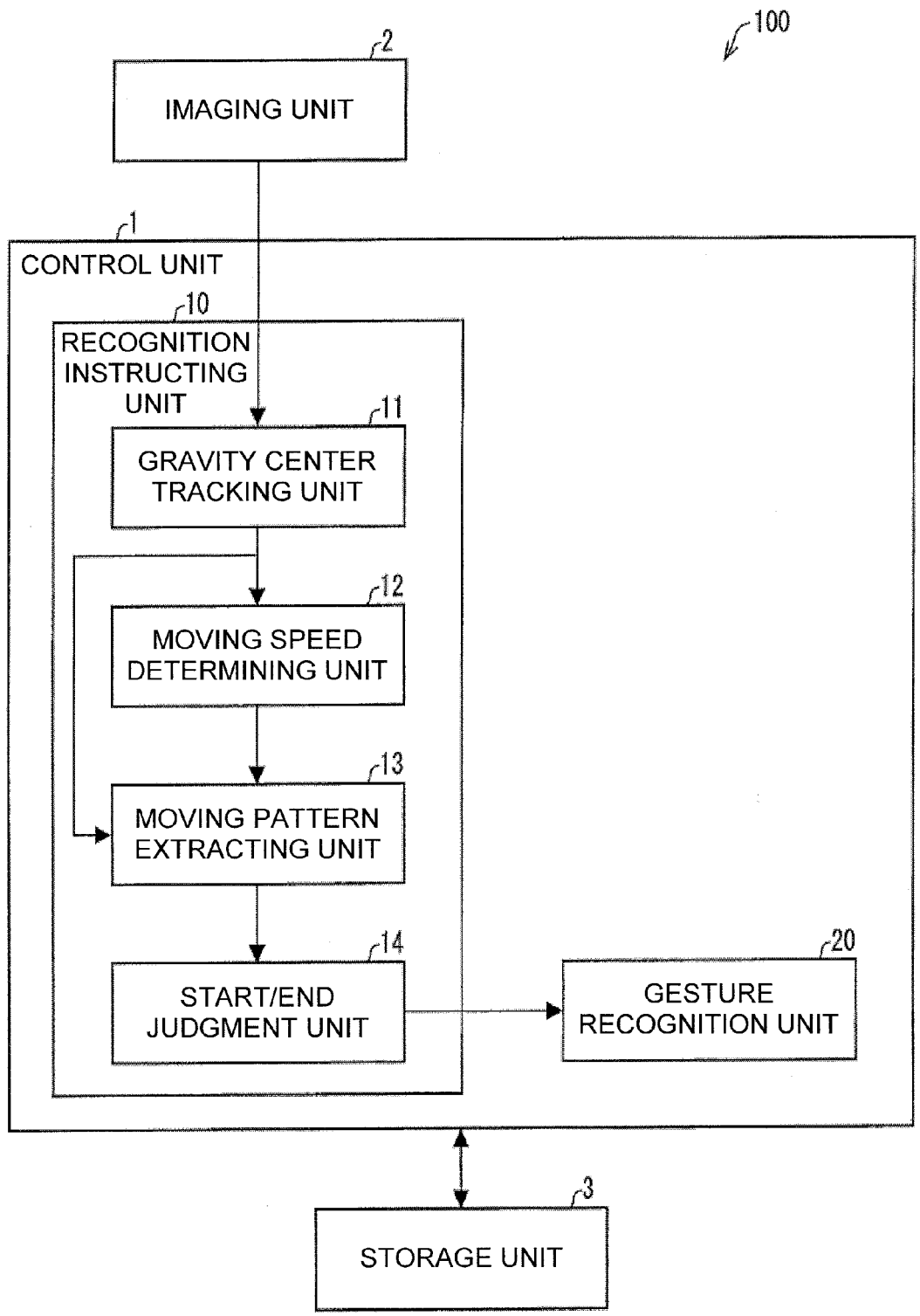
FIG. 1 is a block diagram illustrating a configuration of a main part of a gesture recognition apparatus according to one or more embodiments of the invention.

FIG. 1 is a block diagram illustrating a configuration of a main part of the gesture recognition apparatus 100 in accordance with one or more embodiments of the invention. Referring to FIG. 1, a gesture recognition apparatus 100 includes a control unit 1, an imaging unit 2, and a storage unit 3. The gesture recognition apparatus 100 may further include a manipulation unit that is used when the user manipulates the gesture recognition apparatus 100 according to a usage environment, a communication unit with which the gesture recognition apparatus 100 conducts communication with an external device, and a display unit that presents various pieces of information retained by the gesture recognition apparatus 100 to the user.

The imaging unit 2 images the specific subject in order to judge the start and end of the gesture and the subject (recognition object) that becomes the gesture recognition target, and the imaging unit 2 produces the moving image data. Particularly, the imaging unit 2 mainly includes a frame memory, a mechanical mechanism, and a motor and the like. The motor includes a zoom lens motor, a focus motor, and a shutter motor and the like. Photoelectric conversion elements such as a CCD (Charge Coupled Device) and a CMOS (Complementary Metal Oxide Semiconductor) are used as the imaging element.

It is not always necessary that the gesture recognition apparatus 100 include the imaging unit 2. In such cases, a communication unit (not illustrated) of the gesture recognition apparatus 100 conducts communication with the separately-provided imaging unit through a communication network, and the gesture recognition apparatus 100 may obtain the moving image through the communication unit.

Various pieces of data dealt with by the gesture recognition apparatus 100 are stored in the storage unit 3, and the storage unit 3 includes a tentative storage unit in which the data is stored in a volatile manner and a storage device in which the data is stored in a non-volatile manner. The tentative storage unit is a so-called working memory in which the data used in calculation and calculation result are tentatively stored in processes of various pieces of processing performed by the gesture recognition apparatus 100, and the tentative storage unit is formed by a RAM (Random Access Memory). A control program and an OS program, which are performed by the control unit 1, and various pieces of data that are read when the control unit 1 performs various functions possessed by the gesture recognition apparatus 100 are stored in the storage device, and the storage device is realized by a ROM (Read Only Memory).

The control unit 1 totally controls each unit of the gesture recognition apparatus 100, and the control unit 1 includes at least a recognition instructing unit 10 and a gesture recognition unit 20 as functional blocks.

The recognition instructing unit 10 analyzes a moving speed and a moving pattern of the specific subject from the moving image obtained with the imaging unit 2, and the recognition instructing unit 10 issues an instruction to start or end the gesture recognition processing according to the analysis result. That is, the recognition instructing unit 10 issues the instruction of the start point or end point of the gesture recognition processing in the moving image to the gesture recognition unit 20. For example, the recognition instructing unit 10 may turn on and off a switch for the gesture recognition.

In one or more embodiments of the invention, the gesture recognition apparatus 100 sets the palm to the specific subject to recognize the postures of the hands and fingers as the recognition object in the live gesture recognition processing. In both the setting and the recognition, the user's hand is used as the subject. At this point, preferably the start/end instructing processing of issuing the instruction to start or end the gesture recognition differs from the gesture recognition processing of discriminating the kinds of the gestures in action of the user's hand.

Generally, in the gesture recognition processing, quickly wiggling action such as high-speed hand waving is not used in the discrimination as a kind of the gesture. In one or more embodiments of the invention, a pattern of the quickly wiggling action, which is not used in the gesture recognition interface, is detected from the movement of the specific subject to judge the start and end of the gesture recognition.

More particularly, in accordance with one or more embodiments, in order to analyze the moving speed and moving pattern of the specific subject, the recognition instructing unit 10 functionally includes a gravity center tracking unit 11, a moving speed determining unit 12, a moving pattern extracting unit 13, and a start/end judgment unit 14. Each unit is described in detail later.

In response to the instruction from the recognition instructing unit 10, the gesture recognition unit 20 detects the gesture from the moving images from the instructed start point to the instructed end point in the moving images obtained with the imaging unit 2, and the gesture recognition unit 20 specifies the kind of the gesture to understand meaning of the gesture. In one embodiment, by way of example, the posture of the user's finger is detected and the kind of the gesture is discriminated according to the finger posture. The recognition result of the gesture recognition unit 20 is supplied to various performing units (not illustrated) of the gesture recognition apparatus 100 that performs processing according to the recognized gesture or an external performing unit.

Each functional block of the control unit 1 is realized such that a CPU (central processing unit) reads a program stored in the storage device implemented by the ROM on the tentative storage unit implemented by the RAM and such that the CPU executes the program.

(Processing Flow of Gesture Recognition Apparatus)

Figure 2:
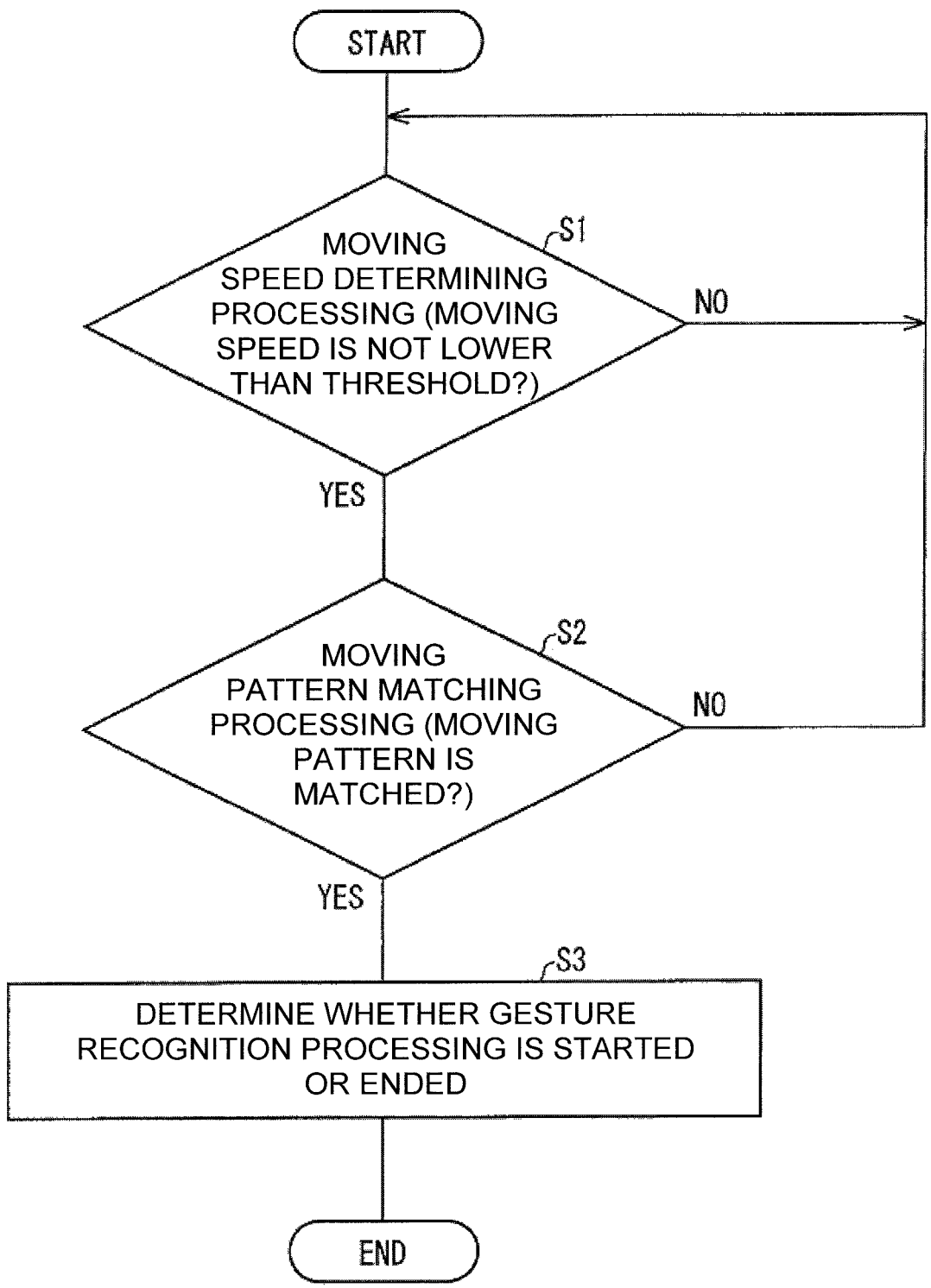
FIG. 2 is a flowchart schematically illustrating start/end instructing processing of the gesture recognition apparatus in accordance with one or more embodiments of the invention.

In accordance with one or more embodiments of the invention, a processing flow in which the gesture recognition apparatus 100 issues the instruction to start or end the gesture recognition will roughly be described below. FIG. 2 is a flowchart schematically illustrating start/end instructing processing of the gesture recognition apparatus 100 in accordance with one or more embodiments of the invention.

When the moving image is obtained, the gravity center tracking unit 11 and moving speed determining unit 12 of the gesture recognition apparatus 100 perform moving speed determining processing (S1). In one or more embodiments of the invention, the gravity center tracking unit 11 tracks a gravity center of the user's palm, and the moving speed determining unit 12 determines the moving speed of the gravity center within a constant time. When the moving speed is not lower than a predetermined threshold (YES in S1), the moving speed determining unit 12 determines that the moving speed of the gravity center is sufficiently quick. The moving pattern extracting unit 13 extracts a moving pattern of the gravity center of the palm to perform moving pattern matching processing (S2). Specifically, the moving pattern extracting unit 13 determines whether the movement of the palm falls within a predetermined range. When the movement of the palm falls within the predetermined range (when moving pattern is matched), the moving pattern extracting unit 13 judges that the palm action is the sufficiently wiggling action (YES in S2). Finally, the start/end judgment unit 14 judges that the palm action expresses the start or end of the gesture recognition, and the start/end judgment unit 14 issues the instruction to start or end the gesture recognition to the gesture recognition unit 20 (S3).

On the other hand, when the movement of the palm does not retain the sufficiently moving speed (NO in S1), or when the movement of the palm does not converge within the predetermined range (NO in S2), the moving pattern extracting unit 13 judges that the movement of the palm is not associated with the start and end of the gesture recognition, and the flow returns to the monitoring of the palm action.

According embodiments in the above-described configurations and methods, because the movement of the specific subject is analyzed from the moving image, when the moving speed determining unit 12 determines that the moving speed of the specific subject is faster than a predetermined value, and only when the moving pattern extracting unit 13 judges that the moving pattern of the specific subject falls within the predetermined range, the start/end judgment unit 14 judges that the movement of the specific subject issues the instruction to start or end the gesture recognition.

Therefore, the user can correctly issue the instruction to start and end the gesture to the gesture recognition apparatus 100 only by the simple action that the user quickly wiggles the specific subject.

Generally the simple action that the user quickly wiggles the specific subject is a special action pattern that is not used too much in the gesture recognition interface of the application. Because the special action pattern is allocated to the sign of the start and end, the action pattern is not mistakenly recognized as the gesture in the live gesture recognition processing. Accordingly, accuracy of the gesture discrimination can largely be improved.

Because the start and end of the gesture can correctly be judged by detecting the specific movement of the specific body, the start and end of the gesture are independent of the special unit, and the user is not forced to prepare and possess the special unit. Specifically, the specific subject that is monitored by the recognition instructing unit 10 for the purpose of the judgment of the start and end may be a specific organ (such as a hand, an arm, and a face) of the user or a daily-possessed personal item (such as a ballpoint pen, a mobile phone, and an employee ID card) having a specific color or a specific shape. That is, because part of the user's body or the daily-possessed personal item can be used as the specific subject, it is not necessary for the user to possess the special unit for the purpose of the gesture recognition. The user can always naturally issue the instruction to start and end the gesture recognition by the simple manipulation.

The gesture recognition unit 20 performs the gesture recognition processing only to the frames that are located during the instruction of the recognition instructing unit 10, it is not necessary to perform the high-load gesture recognition processing to all the frames of the moving image. Particularly, it is not always necessary to perform the high-load processing such as the recognition of the finger posture, so that the load on the gesture recognition apparatus 100 can largely be reduced.

A configuration of the recognition instructing unit 10 and a flow of the start/end instructing processing performed by the recognition instructing unit 10 will be described in detail.

(Detailed Gesture Recognition Apparatus)

Figure 3:
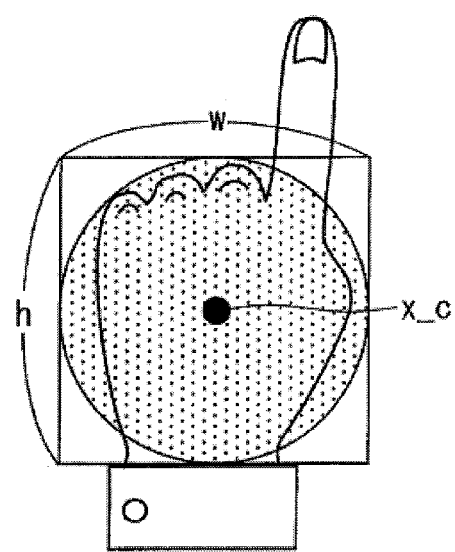
FIG. 3 is a view illustrating specific examples of a palm region detected by the gesture recognition apparatus (gravity center tracking unit) of the embodiment, a palm region size, and a gravity center of the palm region.

The gravity center tracking unit 11 of the recognition instructing unit 10 specifies a specific subject region from each frame of the moving image to compute a coordinate of the gravity center of the specified region. In one or more embodiments of the invention, the gravity center tracking unit 11 detects the user's palm as the specific subject to specify the palm region of the palm. Conventional techniques can appropriately be adopted in the method for detecting and specifying the palm region. A method of detecting the hand, disclosed in Lars Bretzner, et al., "Hand Gesture Recognition using Multi-Scale Colour Features, Hierarchical Models and Particle Filtering", Automatic Face and Gesture Recognition, 2002. Proceedings of Fifth IEEE International Conference on Volume, Issue, 20-21 May 2002 Page 423-428, hereby incorporated by reference in its entirety, can be adopted by way of example. According to the method, a detected blob feature is defined as the palm. Specifically, as illustrated in FIG. 3, the gravity center tracking unit 11 defines the blob (circular region) such that most of a flesh-colored region is included in the blob, and the gravity center tracking unit 11 may directly specify the blob as the palm region. The palm region is defined by a circle, which allows the gravity center tracking unit 11 to obtain a gravity center x_c of the palm region by the simple computation. According to the method, a computation amount can largely be reduced compared with the case where the flesh-colored region having a complicated shape is detected as the palm region. Alternatively, as illustrated in FIG. 3, the palm region is defined as a circumscribed rectangle of the circle, and a size h_size of the palm region may be defined as an area of the circumscribed rectangle. That is, the size h_size of the palm region is defined by w*h in the example illustrated in FIG. 3.

Alternatively, the gravity center tracking unit 11 may compute the gravity center x_c of the palm region based on the following equation (Formula 1):

$$X\_c = \frac{\sum_{j=1}^{m} X_j}{m} \qquad \text{[Formula 1]}$$

Where X j=(xj, yj) expresses a point in the detected palm region and m expresses the number of points.

The gravity center tracking unit 11 may detect the palm region and a gravity center position coordinate of the palm region in each of all the frames of the moving image. However, preferably the gravity center tracking unit 11 detects the palm region at predetermined intervals of the frames (at predetermined time intervals of seconds) in consideration of processing efficiency.

In one or more embodiments of the invention, in the gravity center tracking unit 11, a detection point is provided at each tint second (for example, 50 milliseconds) of the moving image, and the palm region and the gravity center position coordinate of the palm region are detected for each frame at the detection point. The gravity center tracking unit 11 sets first-time detection of a first frame (Frame 0) to a zero time, and the gravity center tracking unit 11 stores the gravity center position coordinate of the palm region obtained by i-th-time detection as x_c[i] in the storage unit 3.

In one or more embodiments of the invention, the gravity center tracking unit 11 computes the size h_size (for example, h_size=w*h as illustrated in FIG. 3) of the palm region that is detected from the first frame (Frame 0) at the point of the first-time (i=0) detection and stores the size h_size in the storage unit 3. The moving speed determining unit 12 refers to the size h_size of the first-time palm region in order to normalize a gravity center moving amount. The moving speed determining unit 12 can compute the moving speed whose scale is unified based on the normalized gravity center moving amount.

A size of the palm imaged on the frame depends on a three-dimensional position or an orientation of the palm. However, when the moving speed of the palm is obtained in a short time, it is assumed that the size of the palm is not extremely changed in the short time, and it is believed that a slight variation in palm region size is small to a negligible extent. Therefore, in the first-time palm region size, a distance from the gravity center at the detection point to the gravity center at the next detection point is normalized by the size h_size of the first-time palm region, which allows the moving distance of the gravity center in each frame to be dealt with as the moving amount in which the scale is unified. As a result, the scale of the moving speed of the gravity center can be unified. For example, the size of the palm image on a camera largely varies, because the users differ from one another in a standing position in front of the camera or because the users differ from one another in the way the user holds out the user's palm. However, according to embodiments of the above-described method, the moving amount is extracted with respect to the size of the imaged palm, so that the variation caused by the difference of the way the user is imaged can be ignored.

When the palm region detected by the gravity center tracking unit 11 is a geometric figure such as the circle and the rectangle, the gravity center tracking unit 11 may obtain the area of the palm region by computation to set the area to the size h_size. Alternatively, the gravity center tracking unit 11 may obtain the area of the circumscribed rectangle of the detected palm region as the size h_size of the palm region. In one or more embodiments of the invention, as illustrated in FIG. 3, a width w and a height h of the circumscribed rectangle of the palm region (hatched circle) are obtained to define the size h_size.

The moving speed determining unit 12 computes the moving speed of the gravity center of the palm region tracked by the gravity center tracking unit 11, and the moving speed determining unit 12 determines whether the moving speed reaches a predetermined speed. In one or more embodiments of the invention, the moving speed determining unit 12 obtains all the moving speeds of the gravity center between the frames at the detection points, and the moving speed determining unit 12 compares the average moving speed to the predetermined threshold.

The moving speed determining unit 12 normalizes a distance between the gravity center position coordinate x_c[0] of the palm region in the frame 0 and the gravity center position coordinate x_c[1] of the palm region in the frame 1 after t_int second by the size h_size of the first-time palm region, and the moving speed determining unit 12 divides the normalized distance by t_int second, to obtain the moving speed v[0].

Figure 4:
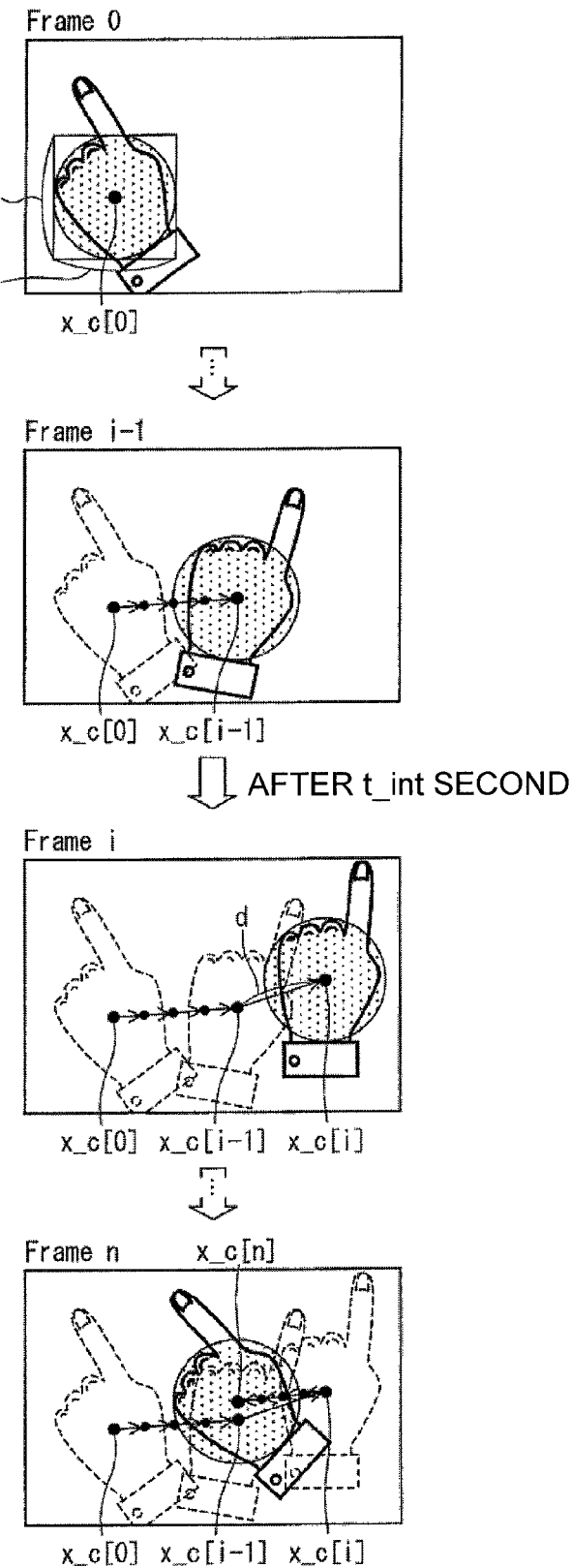
FIG. 4 is a view illustrating a specific example of each frame of a moving image in which a specific subject (palm) is taken and a view explaining an operation that the gesture recognition apparatus (moving speed determining unit) computes a moving speed of the gravity center based on movement of the gravity center in accordance with one or more embodiments of the invention.

As illustrated in FIG. 4, similarly, between the following frames, the distance between the gravity center position coordinate x_c[i−1] in the frame i−1 obtained in the (i−1) th-time detection and the gravity center position coordinate x_c[i] in the frame i is normalized by the size h_size, and the normalized distance is divided by t_int second to compute the moving speed v[i−1]. The moving speed determining unit 12 repeats the computation up to the gravity center position coordinate x_c[n] detected at the n-th time detection until the moving speed v[n−1] in the frame n at the finial detection point is computed.

When an average moving speed V_a of the moving speeds V[i−1] obtained between the frames is not lower than a predetermined threshold T_v, the moving speed determining unit 12 determines that the palm action is probably the instruction of the start and end because the palm action is sufficiently quick. At this point, the pieces of data obtained by the gravity center tracking unit 11 and the moving speed determining unit 12 are stored in the storage unit 3 and transferred to the moving pattern extracting unit 13 that performs the moving pattern matching processing.

The value (t_int) of the time interval at the detection point and the threshold (T_v) of the speed are optimally selected from experiments or experiences.

The moving pattern extracting unit 13 extracts the moving pattern when the specific object (palm) moves. The start/end judgment unit 14 judges whether the moving range of the specific object converges within the predetermined range, and the start/end judgment unit 14 issues the instruction of the start or end point in the moving image to the gesture recognition unit 20 according to the judgment result.

In one or more embodiments of the invention, the moving pattern extracting unit 13 obtains a variance X_v of the gravity center position coordinate X_c[i] of the palm region tracked by the gravity center tracking unit 11. The start/end judgment unit 14 compares the variance to a predetermined threshold. When the variance falls within a range between predetermined thresholds T_h and T_l (T_l<T_h), the start/end judgment unit 14 issues the instruction to start or end the gesture recognition to the gesture recognition unit 20.

Figure 5:
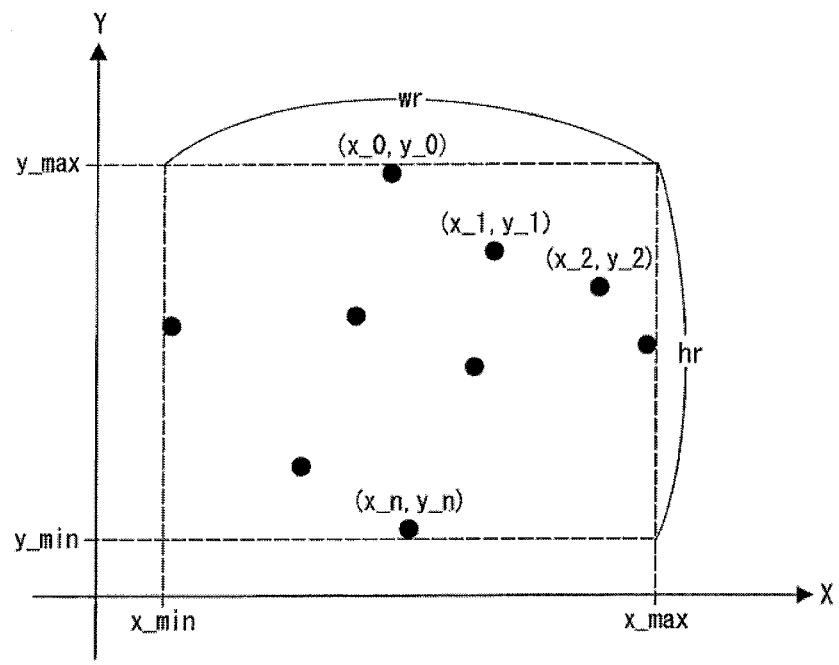
FIG. 5 is a view illustrating a distribution of a gravity center position coordinate of a moving palm and a view explaining an operation that the gesture recognition apparatus (moving pattern extracting unit) computes a distribution range size based on the distribution in accordance with one or more embodiments of the invention.

In one or more embodiments of the invention, the moving pattern extracting unit 13 normalizes the gravity center position coordinate of the palm obtained by the gravity center tracking unit 11 in order to unify the scale of the moving distance of the gravity center. More particularly, the moving pattern extracting unit 13 normalizes the gravity center position coordinate of the palm using a size hr_size of the circumscribed rectangle obtained from a distribution of the detected gravity center position coordinate. The size hr_size of the circumscribed rectangle expresses a distribution range size of the gravity center of the palm. For example, as illustrated in FIG. 5, a difference between a maximum value x_max and a minimum value x_min of the x-coordinate value of each gravity center in the set of gravity centers is set to a width wr of the circumscribed rectangle, and a difference between a maximum value y_max and a minimum value y_min of the y-coordinate value is set to a height hr of the circumscribed rectangle, thereby obtaining the size hr_size.

The moving pattern extracting unit 13 computes the variance X_v of the normalized gravity center position coordinate X_cn[i]. Specifically, the moving pattern extracting unit 13 can compute the variance X_v based on the following equation (Formula 2):

$$X\_v = \sqrt{\frac{\sum_{i=0}^{n}(X\_{cn}[i] - \overline{X\_{cn}})^2}{n+1}} \quad \text{[Formula 2]}$$

Where X_cn[i] expresses the normalized gravity center position coordinate of the gravity center in each frame.

$$\overline{X\_{cn}} \quad \text{[Formula 3]}$$

Formula 3 expresses an average position coordinate of all the gravity centers, and n+1 expresses the number of gravity centers.

According to one or more embodiments of the method, the scales of the moving distances of the gravity centers can be unified, so that the scale of the variance range can be unified. For example, the size of the palm image on a camera largely varies, because the users differ from one another in the standing position in front of the camera or because the users differ from one another in the way the user holds out the user's palm. The magnitude of the variance cannot be determined using a common threshold in the direct variance value in which the normalization is not performed nor is considered the difference of the palm size. However, according to embodiments of the above-described method, the variance is extracted within the maximum range where the palm moves, so that the variation caused by the difference of the way the user is imaged can be ignored to unify the scale of the variance.

When the variance of the gravity center of the palm obtained in the above-described manner is located between the predetermined thresholds T_h and T_I (T_I<T_h), the start/end judgment unit 14 judges that the palm is sufficiently wiggled with an intention (not insensible shakiness), and the start/end judgment unit 14 judges that the palm action is the instruction of the start or end of the gesture recognition. The start/end judgment unit 14 issues the instruction to start or end the gesture recognition to the gesture recognition unit 20. For example, the switch of the gesture recognition processing is turned on and off.

The upper threshold T_h and lower threshold T_I of the variance are optimally selected from experiments or experiences.

A flow of processing in each unit will be described in detail with reference to FIG. 6 and FIG. 7.

(Flow of Moving Speed Determining Processing)

Figure 6:
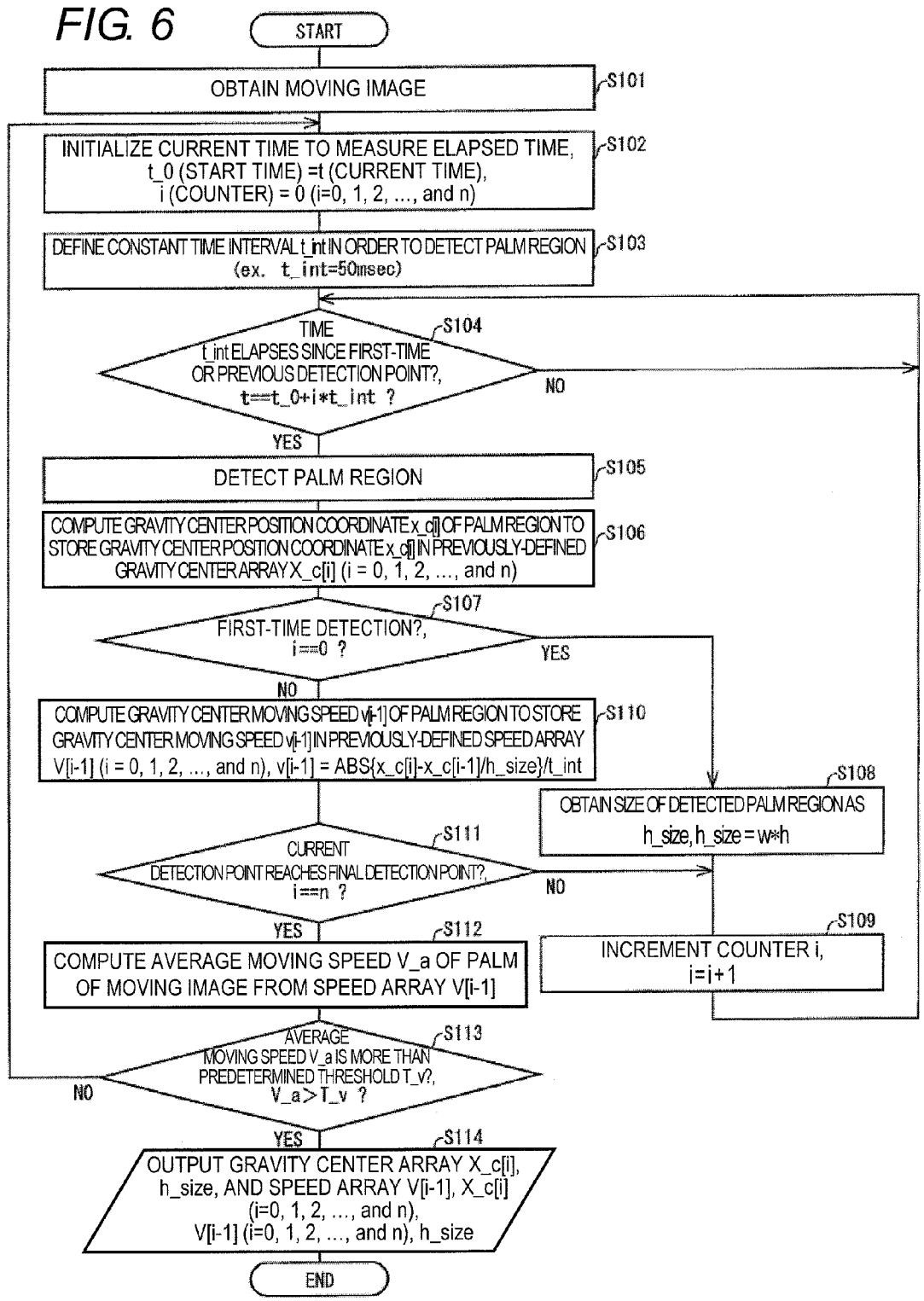
FIG. 6 is a flowchart illustrating a flow of moving speed determining processing in a gravity center tracking unit and a moving speed determining unit of the gesture recognition apparatus in accordance with one or more embodiments of the invention.

FIG. 6 is a flowchart illustrating a flow of the moving speed determining processing in the gravity center tracking unit 11 and the moving speed determining unit 12.

The gravity center tracking unit 11 obtains the moving image taken with the imaging unit 2 (S101), and the gravity center tracking unit 11 starts the monitoring of the palm action (S102). Specifically, the gravity center tracking unit 11 sets a start time t_0 to a current time t to start the monitoring of the palm and measurement of an elapsed time of the frame, and the gravity center tracking unit 11 sets a detection counter i to 0.

The gravity center tracking unit 11 obtains the time interval t_int in order to detect the palm region and the gravity center of the palm region (S103). For example, the time interval t_int is 50 milliseconds, and the optimum time interval t_int is previously fixed and stored in the storage unit 3.

The gravity center tracking unit 11 determines whether a condition that the current time t is a monitoring start time t_0 (i=0) or the current time t reaches t_0+i*t_int (S104) is satisfied. When the condition is satisfied (YES in S104), the flow goes to processing of detecting the palm region with respect to the frame at the current time t (S105). When the condition is not satisfied (NO in S104), the measurement of the moving image reproducing time and the monitoring of the palm are continued. That is, the gravity center tracking unit 11 detects the palm region and the gravity center of the palm region with respect to the initial frame at the first-time detection point, and the gravity center tracking unit 11 judges that the frame at that time is the detection point at intervals of t_int seconds.

When computing gravity center position coordinate x_c[i] of the palm region in the i-th-time detection, the gravity center tracking unit 11 stores the i-th-time gravity center position coordinate x_c[i] in a gravity center array X_c[i] (i=0, 1, 2, . . . , and n) that is previously defined in the storage unit 3 (S106). Each of the gravity center array X_c[i] and the gravity center position coordinate x_c[i] that is an element of the gravity center array X_c[i] includes the pieces of information on the x-coordinate value and the y-coordinate value.

In one or more embodiments of the invention, when S105 and S106 are the pieces of processing at the first-time detection point (zero-time detection) (YES in S107), the gravity center tracking unit 11 obtains the size h_size of the palm region detected from the first frame and stores the size h_size in the storage unit 3. At this point, as illustrated in FIG. 3, the gravity center tracking unit 11 obtains the width w and height h of the circumscribed rectangle of the palm region (hatched circle) to define the size h_size (S108). Then the gravity center tracking unit 11 increments the detection counter i by 1 (S109), and the gravity center tracking unit 11 continues the time measurement and the monitoring until the current time t reaches the next detection point.

On the other hand, when S105 and S106 are the pieces of processing at the detection points from the second-time detection point (NO in S107), because the gravity center is computed at the previous detection point, the moving speed determining unit 12 computes the moving speed of the gravity center based on the distance (the moving distance of the gravity center) from the gravity center at the previous detection point to the gravity center at the current detection point and the time t_int.

Specifically, the moving speed determining unit 12 normalizes the distance d between the gravity center x_c[i−1] obtained at the previous ((i−1) th time) detection point (frame i−1 in FIG. 4) and the gravity center x_c[i] obtained in the current (i-th time) detection point (frame i) by the size h_size of the first-time palm region obtained in S108, and the moving speed determining unit 12 computes the moving amount. The moving amount is computed using an absolute value of the distance d. The moving direction is ignored because the variance of the gravity center position coordinate of the moving palm is confirmed in the subsequent step. That is, the moving amount is obtained by the following equation:

moving amount=|(x_c[i]−x_c[i−1])/h_size|

The moving speed determining unit 12 divides the obtained moving amount by the elapsed time (in this case, the time interval t_int) to compute the moving speed v[i−1] from the previous ((i−1) th time) detection point to the current (i-th time) detection point. The moving speed determining unit 12 stores the moving speed v[i−1] in a speed array v[i−1] (i=1, 2, . . . , and n) previously defined in the storage unit 3 (S110). In one or more embodiments of the invention, the size h_size of the palm region is defined as w*h in order to normalize the distance d between the gravity centers. Alternatively, for example, only larger one of the width w and height h of the palm region may be normalized. That is, the size h_size may be defined as max (w,h). Alternatively, in accordance with one or more embodiments of the invention, a length in an x-axis direction of a vector of the distance d may be normalized by the width w of the palm region while a length in a y-axis direction of the vector of the distance d is normalized by the height h of the palm region.

When the current detection point (i-th time) does not reach the final detection point (n-th time) (NO in S111), the gravity center tracking unit 11 increments the detection counter i by 1 (S109), and the gravity center tracking unit 11 continues the time measurement and the monitoring until the current time t reaches the next detection point.

On the other hand, the current time t reaches the final detection point (n-th time) to store all n moving speeds between the frames in the speed array V[i−1] (i=1, 2, . . . , and n) (YES in S111), the moving speed determining unit 12 computes the average moving speed V_a of the palm that is of the specific subject of the moving image from the speed array V[i−1] (S112). The moving speed determining unit 12 compares the predetermined threshold T_v of the average moving speed to the average moving speed V_a.

When the average moving speed V_a is equal to or lower than the threshold T_v (NO in S113), the moving speed determining unit 12 determines that the palm action is not quick, and therefore the moving speed determining unit 12 determines that the palm action is not the instruction of the start and end of the gesture recognition. When the obtained moving image is still continued, the various pieces of data are initialized, and the flow returns to S102 to repeat the pieces of processing from S102.

On the other hand, when the average moving speed V_a is more than the threshold T_v (YES in S113), the moving speed determining unit 12 determines that the palm action is sufficiently quick, and therefore the moving speed determining unit 12 determines that the palm action is probably the instruction of the start and end of the gesture recognition.

At this point, the gravity center array x_c[i] and first-time palm region size h_size, output from the gravity center tracking unit 11, and the speed array V[i−1] output from the moving speed determining unit 12 are stored in the storage unit 3 (S114), and the gravity center tracking unit 11 and the moving speed determining unit 12 end the moving speed determining processing. When the moving speed determining processing is ended, the moving pattern extracting unit 13 and the start/end judgment unit 14 start the moving pattern matching processing.

(Flow of Moving Pattern Matching Processing)

Figure 7:
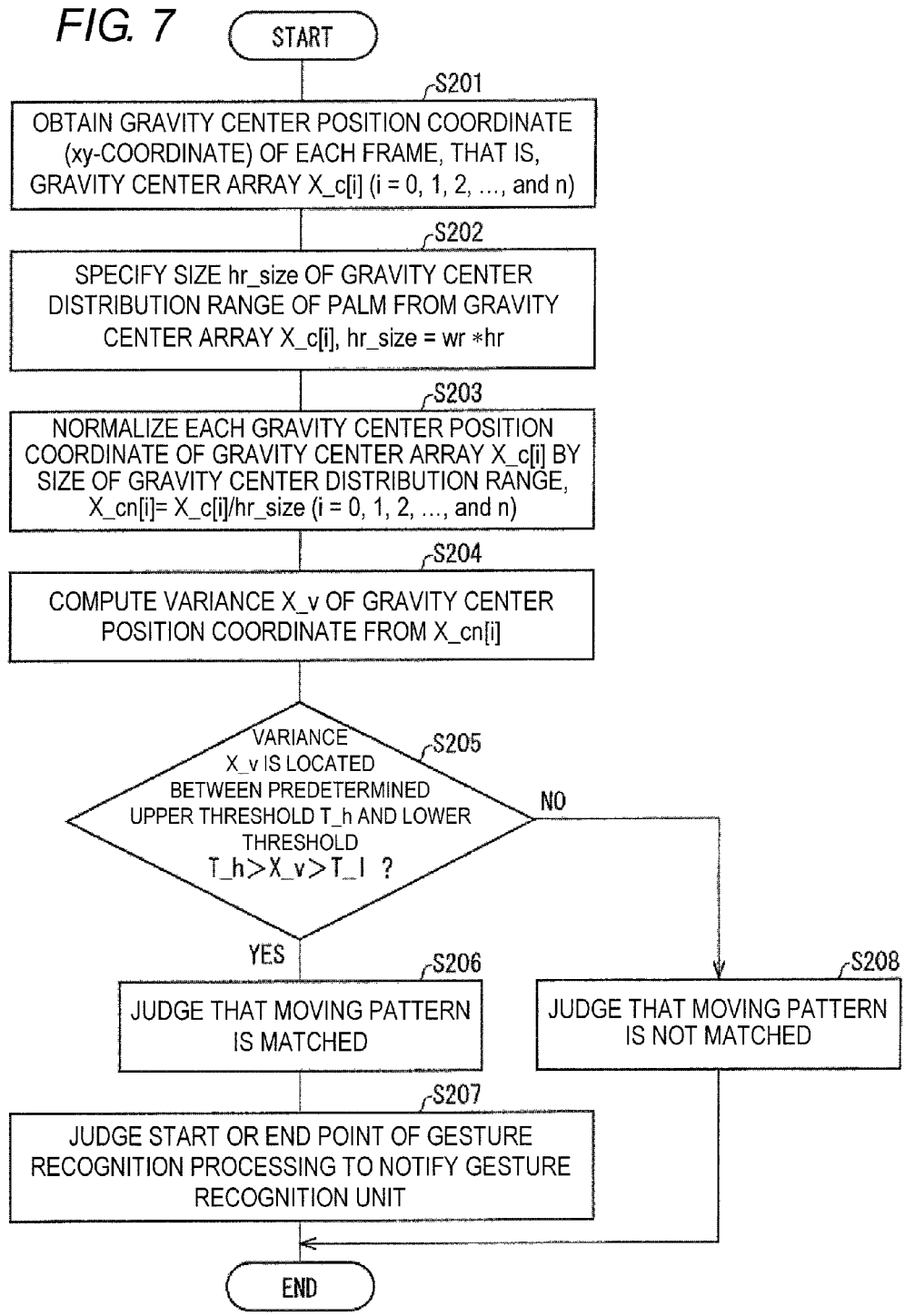
FIG. 7 is a flowchart illustrating a flow of moving pattern matching processing in a moving pattern extracting unit and a start/end judgment unit in accordance with one or more embodiments of the invention.

FIG. 7 is a flowchart of the moving pattern matching processing in the moving pattern extracting unit 13 and the start/end judgment unit 14 in accordance with one or more embodiments of the invention.

The moving pattern extracting unit 13 obtains the gravity center position coordinates (x- and y-coordinates) of each frame, which are output from the gravity center tracking unit 11. That is, the moving pattern extracting unit 13 obtains the gravity center array X_c[i] from the storage unit 3 (S201). The moving pattern extracting unit 13 analyzes the gravity center distribution of the palm from the obtained gravity center array X_c[i], and the moving pattern extracting unit 13 specifies the size (the size hr_size of the gravity center distribution range) of the distribution range (S202). As described above with reference to FIG. 5, the moving pattern extracting unit 13 sets the difference between the maximum value x_max and minimum value x_min of the x-coordinate value of each gravity center to the width wr, sets the difference between the maximum value y_max and minimum value y_min of the y-coordinate value of each gravity center to the height hr, and defines the size hr_size=wr*hr of the gravity center distribution range.

The moving pattern extracting unit 13 normalizes the gravity center position coordinates (x- and y-coordinates) of the gravity center array X_c[i] by the size hr_size of the gravity center distribution range obtained in S202 (S203). That is, each normalized gravity center position coordinate (x_cn[i]) is obtained by the following equation:

$$X\_cn[i]=X\_c[i]/hr\_size$$

Where i=0, 1, 2, . . . , and n. Therefore the scales of the moving distances of the gravity centers are unified.

In one or more embodiments of the invention, the size hr_size of the gravity center distribution range is defined as wr*hr in order to normalize each gravity center position coordinate. Alternatively, for example, only larger one of the width wr and height hr of the gravity center distribution range size may be normalized. That is, the size hr_size may be defined as max(wr,hr). Alternatively, the x-coordinate may be normalized by the width wr while the y-coordinate is normalized by the height hr.

The moving pattern extracting unit 13 computes the variance X_v of the gravity center position coordinate of the normalized palm obtained in S203 (S204). The variance is computed using the equation (Formula 2).

Then the start/end judgment unit 14 judges whether the moving pattern is matched based on the variance obtained in S204 by the moving pattern extracting unit 13. For the instruction to start or end the gesture recognition, the moving pattern of the gravity center is not the insensible movement of a slight amount, but the moving pattern of the gravity center is moved with the intention. Therefore, the moving pattern of the gravity center exhibits at least a certain level of variance. Additionally, because the moving pattern of the gravity center periodically repeats the quickly wiggling action, it is believed that the variance converges within the predetermined range.

The start/end judgment unit 14 compares the variance X_v to the upper threshold T_h and lower threshold T_l of the variance (S205). When the variance X_v falls within the range of the predetermined threshold (YES in S205), the start/end judgment unit 14 judges that the palm action is matched with the moving pattern of the start or end of the gesture recognition (S206). The start/end judgment unit 14 judges that the point at which the palm is wiggled is the start or end point of the gesture recognition processing, and the start/end judgment unit 14 notifies the gesture recognition unit 20 (S207). The start/end judgment unit 14 may notify the gesture recognition unit 20 of the frame position on the moving image corresponding to the start or end point, or the start/end judgment unit 14 may turn on an off the switch when the switch that issues the instruction of the gesture recognition processing is provided in the gesture recognition unit 20.

On the other hand, when the variance X_v does not fall within the predetermined threshold (NO in S205), the start/end judgment unit 14 judges that the palm action is not matched with the moving pattern of the start or end (S208).

The start/end judgment unit 14 performs the processing in S207 or S208 to end the moving pattern matching processing. When the obtained moving image is still continued, the various pieces of data are initialized, the flow returns to S102, and the gravity center tracking unit 11 repeats the pieces of processing from S102.

In one or more embodiments of the invention, the gesture recognition apparatus 100 determines the instruction of the start and end of the gesture recognition processing based on the two-dimensional moving distance and moving pattern of the specific subject detected from the two-dimensional image. However, the configuration of the gesture recognition apparatus of the invention is not limited to the embodiment.

For example, for use of an already-calibrated image system that can detect the three-dimensional position of the specific subject, that the moving range of the specific subject converges within a constant three-dimensional space, and that the specific subject has a moving speed above a certain level can be defined as the instruction of the start and end of the gesture recognition processing.

In one or more embodiments of the invention, the movement of the specific subject, used as the criteria for the moving speed and moving pattern of the specific subject, is used as the signs of the start and end of the live gesture recognition processing. On the other hand, the movement of the specific subject, used as the criteria for the moving speed and moving pattern of the specific subject, can also be used as a kind of user interface in the application in the live gesture recognition processing, that is, as the gesture that is used until the end sign since the start sign.

At this point, possibly the false recognition is generated when the signs of the start and end of the gesture recognition processing becomes similar to the gesture that should be recognized in the live gesture recognition processing.

Therefore, in one or more embodiments of the invention, the conditions of the moving speed and moving pattern allocated to the signs of the start and end of the gesture recognition processing differ largely from the conditions of the moving speed and moving pattern allocated to each gesture, which allows the trouble to be solved.

For example, a pattern in which the circle is quickly drawn by the palm to some extent is allocated to the signs of the start and end of the gesture recognition processing, and a pattern of the vertically or horizontally handwaving that is very different from the circular movement is allocated to another gesture.

According to one or more embodiments of the invention, in addition to the instruction to start and end the gesture recognition processing, the gesture can be recognized by analyzing the moving speed and the moving pattern (variance).

Therefore, the gesture recognition apparatus that correctly recognizes the instruction on the gesture recognition processing independently of the special unit by the simple manipulation of the user while the load on the processing is further largely reduced can be implemented.

The invention is not limited to the embodiments described above, but various changes can be made without departing from the scope of the invention. An embodiment obtained by appropriately combining technical unit disclosed in the different embodiments also included in the technical range of the invention.

Finally, each block of the gesture recognition apparatus 100, particularly the gravity center tracking unit 11, the moving speed determining unit 12, the moving pattern extracting unit 13, and the start/end judgment unit 14 may be formed by hardware logic or may be realized as follows by software using the CPU.

That is, the gesture recognition apparatus 100 includes the CPU (Central Processing Unit) that executes a command of a control program realizing each function, the ROM (Read Only Memory) in which the program is stored, the RAM (Random Access Memory) in which the program is expanded, and the storage device (recording medium) such as a memory in which the program and various pieces of data are stored. Program codes (an executable format program, an intermediate code program, and a source program) of the control programs that are of the software realizing the functions in the gesture recognition apparatus 100 are recorded in the recording medium while the computer can be read the program codes, the recording medium is supplied to the gesture recognition apparatus 100, and the computer (or the CPU or MPU) reads and executes the program code recorded in the recording medium, which allows the object of the invention to be achieved.

Examples of the recording medium include tape system such as magnetic tape and cassette tape, disk systems including magnetic disks such as floppy disk (registered trademark) and a hard disk and optical disks such as a CD-ROM, an MO, an MD, a DVD, and a CD-R, card systems such as an IC card (including a memory card) and an optical card, and semiconductor memory systems such as a mask ROM, an EPROM, an EEPROM and a flash ROM.

In accordance with one or more embodiments of the invention, the gesture recognition apparatus 100 is configured to be able to be connected to a communication network, and the program code may be supplied through the communication network. There is no particular limitation to the communication network. Examples of the communication network include the Internet, an intranet, an extranet, a LAN, an ISDN, a VAN, a CATV communication network, a virtual private network, a telephone line network, a mobile communication network, and a satellite communication network. There is no particular limitation to a transmission medium included in the communication network. Examples of the transmission medium include wired lines such as IEEE 1394, a USB, a power-line carrier, a cable TV line, a telephone line, and an ADSL line and wireless lines such as infrared ray such as IrDA and a remote controller, Bluetooth (registered trademark), 802.11 wireless, HDR, a mobile telephone network, a satellite line, and a terrestrial digital network. The invention can be realized in the form of a computer data signal embedded in a carrier wave in which the program code is embodied by electronic transmission.

According to the configuration of the gesture recognition apparatus of one or more embodiments of the invention, the user can correctly and simply issue the instruction to start and end the gesture recognition processing by the natural action without the use of the special unit, and it is not always necessary for the gesture recognition apparatus to perform the gesture recognition processing of the high-load processing. Therefore, in various fields where the system that performs processing according to the kind of the gesture is used, the gesture recognition apparatus of the embodiment can be used without the restriction of the apparatus performance or peripheral devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A gesture recognition apparatus that performs gesture recognition processing of recognizing a gesture from action of a recognition object taken in a moving image, the gesture recognition apparatus comprising:

a gesture recognizing unit for performing the gesture recognition processing;

a specific subject detecting unit for detecting a specific subject having a specific feature from the moving image;

a moving speed computing unit for computing a moving speed per unit time of the specific subject;

a moving pattern extracting unit for extracting a moving pattern of the specific subject; and a start/end judgment unit for judging movement of the specific subject as an instruction of start or end of the gesture recognition processing when the moving speed and the moving pattern satisfy predetermined conditions, wherein, if the start/end judgment unit starts the gesture recognition processing, the gesture recognizing unit performs the gesture recognition processing by recognizing a shape or a posture of the specific subject.

2. The gesture recognition apparatus according to claim 1, wherein the specific subject detecting unit detects an organ of a user or part of the organ as the specific subject.

3. The gesture recognition apparatus according to claim 2, wherein the specific subject detecting unit detects a palm of the user as the specific subject.

4. The gesture recognition apparatus according to claim 3, further comprising:
a gesture recognition unit for performing the gesture recognition processing by discriminating a finger posture of the user as the recognition object taken in a moving image,
wherein the shape or the posture of the specific subject is a finger posture of the user;
wherein the gesture recognition unit discriminates the finger posture from a frame of the moving image from a start point to an end point, and
wherein the start point and the end point are judged by the start/end judgment unit.

5. The gesture recognition apparatus according to claim 1, wherein the specific subject detecting unit detects a user's possession having a specific feature in color or shape as the specific subject.

6. The gesture recognition apparatus according to claim 1, wherein the input instruction discriminating unit is a gesture recognition unit for recognizing the movement of the specific subject as the gesture based on the moving speed and the moving pattern of the specific subject.

7. A gesture recognition apparatus that performs gesture recognition processing of recognizing a gesture from action of a recognition object taken in a moving image, the gesture recognition apparatus comprising:
a specific subject detecting unit for detecting a specific subject having a specific feature from the moving image;
a moving speed computing unit for computing a moving speed per unit time of the specific subject;
a moving pattern extracting unit for extracting a moving pattern of the specific subject; and
an input instruction discriminating unit for discriminating movement of the specific subject as an instruction input to the gesture recognition apparatus when the moving speed and the moving pattern satisfy predetermined conditions,
wherein the specific subject detecting unit specifies a specific subject region including at least part of the specific subject on a frame of the moving image and specifies a gravity center position coordinate in the specific subject region.

8. The gesture recognition apparatus according to claim 7, wherein the moving speed computing unit normalizes a moving distance per unit time of the gravity center in the specific subject region by a size of the specific subject region and computes the moving speed based on a gravity center moving amount obtained by the normalization.

9. The gesture recognition apparatus according to claim 7, wherein the moving pattern extracting unit extracts a variance of the gravity center position coordinates with respect to the gravity centers of the specific subject regions, the gravity centers of the specific subject regions being specified with respect to the plurality of frames in the moving image.

10. The gesture recognition apparatus according to claim 9, wherein the input instruction discriminating unit discriminates the movement of the specific subject as the instruction of the start or end of the gesture recognition processing, when the moving speed computed by the moving speed computing unit is more than a predetermined threshold, and when the variance of the gravity center position coordinate extracted by the moving pattern extracting unit falls within a range from a predetermined lower threshold to a predetermined upper threshold.

11. A method for controlling a gesture recognition apparatus that performs gesture recognition processing of recognizing a gesture from action of a recognition object taken in a moving image, the gesture recognition apparatus controlling method comprising the steps of:
performing the gesture recognition processing;
detecting a specific subject having a specific feature from the moving image;
computing a moving speed per unit time of the specific subject;
extracting a moving pattern of the specific subject; and
judging movement of the specific subject as an instruction of start or end of the gesture recognition processing when the moving speed and the moving pattern satisfy predetermined conditions,
wherein, if the gesture recognition processing is started based on the judgment of the movement of the specific subject, the gesture recognizing unit performs the gesture recognition processing is performed by recognizing a shape or a posture of the specific subject.

12. A gesture recognition apparatus that performs gesture recognition processing of recognizing a gesture from action of a recognition object taken in a moving image, the gesture recognition apparatus comprising:
a specific subject detecting unit for detecting a specific subject having a specific feature from the moving image;
a moving speed computing unit for computing a moving speed per unit time of the specific subject;
a moving pattern extracting unit for extracting a moving pattern of the specific subject; and
an input instruction discriminating unit for discriminating movement of the specific subject as an instruction input to the gesture recognition apparatus when the moving speed and the moving pattern satisfy predetermined conditions,
wherein the input instruction discriminating unit comprises a start/end judgment unit for judging the action of the specific subject as an instruction of start or end of the gesture recognition processing based on the moving speed and the moving pattern of the specific subject; and,
wherein the specific subject detecting unit specifies a specific subject region including at least part of the specific subject on a frame of the moving image and specifies a gravity center position coordinate in the specific subject region.

13. The gesture recognition apparatus according to claim 12, wherein the moving speed computing unit normalizes a moving distance per unit time of the gravity center in the specific subject region by a size of the specific subject region and computes the moving speed based on a gravity center moving amount obtained by the normalization.

14. The gesture recognition apparatus according to claim 12, wherein the moving pattern extracting unit extracts a variance of the gravity center position coordinates with respect to the gravity centers of the specific subject regions, the gravity centers of the specific subject regions being specified with respect to the plurality of frames in the moving image.

15. The gesture recognition apparatus according to claim 12, wherein the input instruction discriminating unit discriminates the movement of the specific subject as the instruction of the start or end of the gesture recognition processing, when the moving speed computed by the moving speed computing unit is more than a predetermined threshold, and when the variance of the gravity center position coordinate extracted by the moving pattern extracting unit falls within a range from a predetermined lower threshold to a predetermined upper threshold.

16. A gesture recognition apparatus that performs gesture recognition processing of recognizing a gesture from action of a recognition object taken in a moving image, the gesture recognition apparatus comprising:
  a specific subject detecting unit for detecting a specific subject having a specific feature from the moving image;
  a moving speed computing unit for computing a moving speed per unit time of the specific subject;
  a moving pattern extracting unit for extracting a moving pattern of the specific subject;
  an input instruction discriminating unit for discriminating movement of the specific subject as an instruction input to the gesture recognition apparatus when the moving speed and the moving pattern satisfy predetermined conditions; and
  a gesture recognition unit for performing the gesture recognition processing by discriminating a finger posture of the user as the recognition object taken in a moving image,
  wherein the input instruction discriminating unit comprises a start/end judgment unit for judging the action of the specific subject as an instruction of start or end of the gesture recognition processing based on the moving speed and the moving pattern of the specific subject;
  wherein the specific subject detecting unit detects an organ of a user or part of the organ as the specific subject;
  wherein the specific subject detecting unit detects a palm of the user as the specific subject;
  wherein the gesture recognition unit discriminates the finger posture from a frame of the moving image from a start point to an end point;
  wherein the start point and the end point are judged by the start/end judgment unit; and
  wherein the specific subject detecting unit specifies a specific subject region including at least part of the specific subject on a frame of the moving image and specifies a gravity center position coordinate in the specific subject region.

17. The gesture recognition apparatus according to claim 16, wherein the moving speed computing unit normalizes a moving distance per unit time of the gravity center in the specific subject region by a size of the specific subject region and computes the moving speed based on a gravity center moving amount obtained by the normalization.

18. The gesture recognition apparatus according to claim 16, wherein the moving pattern extracting unit extracts a variance of the gravity center position coordinates with respect to the gravity centers of the specific subject regions, the gravity centers of the specific subject regions being specified with respect to the plurality of frames in the moving image.

19. A non-transitory computer readable medium for controlling a gesture recognition apparatus that performs gesture recognition processing of recognizing a gesture from action of a recognition object taken in a moving image, the gesture recognition apparatus controlling method comprising the steps of:
  performing the gesture recognition processing;
  detecting a specific subject having a specific feature from the moving image;
  computing a moving speed per unit time of the specific subject;
  extracting a moving pattern of the specific subject; and
  judging movement of the specific subject as an instruction of start or end of the gesture recognition processing when the moving speed and the moving pattern satisfy predetermined conditions,
  wherein, if the gesture recognition processing is started based on the judgment of the movement of the specific subject, the gesture recognizing unit performs the gesture recognition processing is performed by recognizing a shape or a posture of the specific subject.

* * * * *